United States Patent
Hanjani

(10) Patent No.: US 6,473,852 B1
(45) Date of Patent: Oct. 29, 2002

(54) METHOD AND CIRCUIT FOR PERFORMING AUTOMATIC POWER ON RESET OF AN INTEGRATED CIRCUIT

(75) Inventor: Hassan Hanjani, Fremont, CA (US)

(73) Assignee: Fairchild Semiconductor Corporation, South Portland, ME (US)

(*) Notice: Subject to any disclaimer, the term of this patent is extended or adjusted under 35 U.S.C. 154(b) by 0 days.

(21) Appl. No.: 09/336,917

(22) Filed: Jun. 21, 1999

Related U.S. Application Data

(60) Provisional application No. 60/106,479, filed on Oct. 30, 1998.

(51) Int. Cl.[7] .................................................. G06F 9/00
(52) U.S. Cl. .................. 713/1; 713/100; 713/310; 710/14; 711/166; 327/143; 327/198
(58) Field of Search ...................... 713/1, 100, 310, 713/330, 10; 327/143, 142, 198; 710/1, 5, 7, 10, 14; 711/166, 154

(56) References Cited

U.S. PATENT DOCUMENTS

| | | | |
|---|---|---|---|
| 4,747,057 A | * 5/1988 | DiGiulio et al. | 364/464 |
| 4,891,743 A | 1/1990 | May et al. | 363/87 |
| 5,159,206 A | * 10/1992 | Tsay et al. | 307/272.3 |
| 5,396,115 A | 3/1995 | Coffman et al. | 327/143 |
| 5,400,034 A | * 3/1995 | Smith | 342/103 |
| 5,542,042 A | 7/1996 | Manson | 395/181 |
| 5,559,458 A | * 9/1996 | Holler, Jr. | 327/143 |
| 5,696,950 A | * 12/1997 | Ichinose et al. | 713/501 |
| 5,704,038 A | 12/1997 | Mueller et al. | 395/185.08 |
| 5,726,941 A | 3/1998 | Tobita | 365/203 |
| 5,737,612 A | * 4/1998 | Ansel et al. | 713/300 |
| 5,809,312 A | 9/1998 | Ansel et al. | 395/750.01 |
| 5,821,787 A | 10/1998 | McClintock et al. | 327/143 |
| 5,850,156 A | 12/1998 | Witman | 327/143 |
| 5,903,718 A | 5/1999 | Marik | 395/183 |
| 5,991,887 A | * 11/1999 | Ezell | 713/340 |
| 6,011,477 A | * 1/2000 | Iwasaki | 331/185 |
| 6,181,173 B1 | * 1/2001 | Homol et al. | 327/143 |
| 6,236,249 B1 | * 5/2001 | Choi et al. | 327/143 |

* cited by examiner

*Primary Examiner*—Jeffrey Gaffin
*Assistant Examiner*—Rijue Mai
(74) *Attorney, Agent, or Firm*—Babak S. Sani; Townsennd and Townsend and Crew LLP

(57) ABSTRACT

Method and circuitry for automatic resetting of an integrated circuit upon power up handles multiple clock sources and minimizes power dissipation. A robust voltage sensing circuit detects power up and triggers resetting of most of the circuit with the exception of the initialization circuit that includes an internal oscillator. After the circuit determines that the internal oscillator signal has settled, contents of non-volatile register are read to select the clock source for the circuit. Upon successful selection and clean up of system clock, the reset is removed.

18 Claims, 3 Drawing Sheets

METHOD AND CIRCUIT FOR PERFORMING AUTOMATIC POWER ON RESET OF AN INTEGRATED CIRCUIT

STATEMENT OF RELATED APPLICATIONS

This patent application claims priority from provisional patent application No. 60/106,479, filed Oct. 30, 1998.

BACKGROUND OF THE INVENTION

The present invention relates generally to integrated circuits, and more particularly to method and circuitry for performing automatic power on reset of an integrated circuit (IC).

An IC is typically made up of various circuit blocks that operate together to provide the required functionality. In many applications, an IC may require an initialization routine for proper operation of the circuits upon power up. The initialization routine generally ensures that, for example, the power supply voltages have reached an acceptable threshold, the clock signal(s) has settled, internal registers have been reset to their proper values, and so on.

Most IC power on reset or initialization routines use a level detect circuit that monitors the power supply voltage level and enables operation of various blocks within the integrated circuit when the voltage level exceeds a predetermined threshold. Today's more complex ICs often integrate different technologies and different types of circuitry on the same die, and tend to operate at lower supply voltage levels, and with wider supply voltage ranges. Conventional power on detect circuits fail to adequately meet the requirements of such circuits. Further, in some application, an IC may be required to operate from more than one clock sources, in which case the initialization routine is more complicated because of the need to select the appropriate clock and to determine when the respective clocks have settled so that only valid clock signals are used.

As can be seen, reliable and efficient techniques for performing automatic power on reset for these integrated circuits are highly desirable.

SUMMARY OF THE INVENTION

The invention provides method and circuitry for performing automatic power on reset for an integrated circuit. In one embodiment, the present invention provides a robust power on detect circuit that operates effectively with a wide ranging power supply voltage that may ramp up more slowly. In another embodiment, the present invention provides a power on reset routine for an IC that may have a number of different clock sources.

Accordingly, in one embodiment, the present invention provides a method for resetting an integrated circuit upon power up, the method including the steps of: detecting a voltage level on a power supply node and generating a power on detect signal when the voltage level reaches a predetermined level; asserting a reset signal in response to the power on detect signal, the reset signal disabling a plurality of internal circuitry except at least an internal oscillator; counting a first predetermined number of cycles of an oscillating output of the internal oscillator; reading contents of a first register to select a clock source, at about the completion of the counting step; if the contents of the first register indicate selection of the internal oscillator, coupling the oscillating output to system clock and de-asserting the reset signal; and if the contents of the first register indicate selection of a second clock source other than the internal oscillator, coupling an output of the second clock source to system clock.

In another embodiment, the present invention provides an integrated circuit including: a controller; a clock circuit coupled to the controller and configured to select between a plurality of clock sources including an internal oscillator; a voltage sensing circuit configured to detect a voltage level on a power supply node; a global reset circuit coupled to the voltage sensing circuit and configured to generate a global reset signal that, when activated, resets most of the integrated circuit except for at least the internal oscillator; and a register coupled to the clock circuit, and configured to store clock information, wherein, when the voltage sensing circuit detects a power up condition, the internal oscillator automatically runs for a predetermined number of cycles before the contents of the register are read to select one of the plurality of clock sources.

In yet another embodiment, the present invention provides a power on detect circuit for signaling a power on condition in response to a voltage level on a power supply node, the power on detect circuit including a diode-coupled transistor having its gate-drain terminal coupled to the power supply node via a switch circuit; a weak transistor having a gate terminal coupled to the gate-drain terminal of the diode-coupled transistor; a first source/drain terminal coupled to the power supply node, and a second source/drain terminal coupled to ground via a delay capacitance; a Schmidt trigger circuit having an input coupled to the second source/drain terminal of the weak transistor; a first inverter having an input coupled to an output of the Schmidt trigger, and an output coupled to the switch circuit; a second inverter having an input coupled to an output of the first inverter, and an output coupled to carry a power on reset output signal.

A better understanding of the nature and advantages of the automatic power on reset method and circuitry of the present invention will be gained by referring to the following detailed description and accompanying drawings.

DESCRIPTION OF THE SPECIFIC EMBODIMENTS

Figure 1:
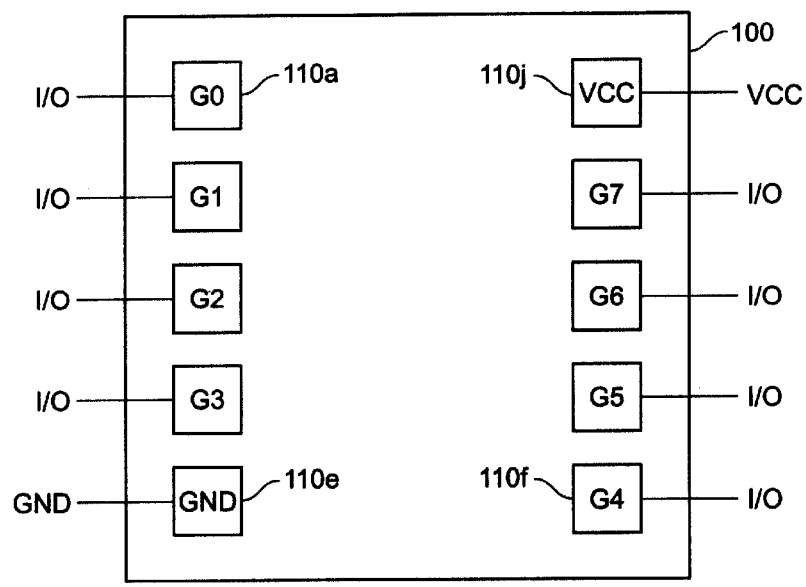
FIG. 1 is a diagram of an integrated circuit package including a plurality of pins.

FIG. 1 is a diagram of an integrated circuit package 100 including a plurality of external device pins 110. Integrated circuit 100 can be a controller, a processor, a microprocessor, a digital signal processor, a memory device, or other electronic circuits. In a specific embodiment, integrated circuit 100 is a controller that provides interface functions for devices such as cellular phones, battery management circuitry for portable applications, computer pointing devices (e.g., mouse, trackball, joystick, etc.), and others devices, or a combination of these devices. As shown in FIG. 1, integrated circuit 100 includes, for example, ten pins. The number of pins on an integrated circuit is usually dictated by the required functionality, cost, and other considerations.

Some of pins 110, such as pins 110e and 110j, are reserved for ground and power supply, respectively. The remaining pins are each generally available for use as an input pin, an output pin, or an input/output (I/O) pin.

Figure 2:
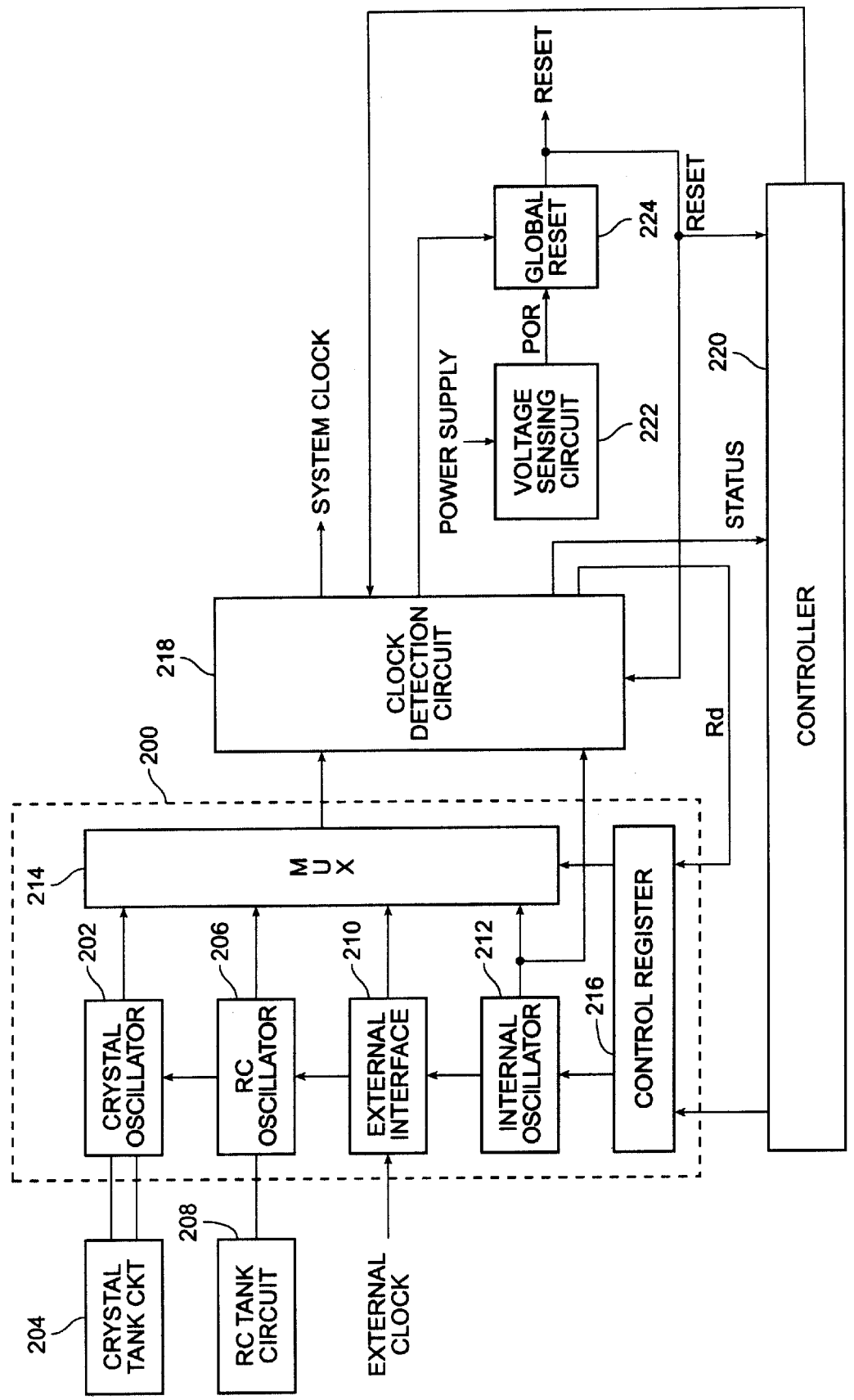
FIG. 2 is a block diagram of an integrated circuit with multiple clock sources.

FIG. 2 is a block diagram of an exemplary embodiment of circuits within integrated circuit 100. In this example, circuit 100 includes a clock circuit 200 that provides and selects between several different clock sources. In the example shown, clock circuit 200 provides four different clock sources including a crystal oscillator 202 that connects to a crystal tank circuit 204, an RC oscillator 206 that connects to an RC tank circuit 208, an external interface 210 for receiving an external clock, and an internal oscillator 212. A multiplexer MUX 214 selects between one of the four in response to a control signal from control register 216. A clock detection circuit 218 receives the output of MUX 214 and supplies a system clock in response to a control signal from a controller 220. A preferred embodiment for clock circuit 200 is described in greater detail in provisional patent Application Serial No. 60/106477 (Atty Dockt No. 18865-14/17732-8717), entitled "PROGRAMMABLE MULTI-SCHEME CLOCKING CIRCUIT," which is incorporated herein by reference for all purposes. It is to be understood, however, that the choice between four types of clock sources as described herein is for illustrative purposes only, and that the teachings of the present invention apply to any circuit with any combination of two or more clock sources (e.g., one internal and one external).

FIG. 2 further includes a voltage sensing circuit 222 that detects the voltage level at the power supply node and generates a power on reset signal POR at its output. In a preferred embodiment, voltage sensing circuit 222 is a robust low voltage detector that accurately senses voltage levels that may ramp up slowly, as well as detecting power supply glitches. Voltage sensing circuit 222 preferably generates POR when the voltage at the power supply node reaches, e.g., approximately 90% of its final value. The operation of voltage sensing circuit 222 will be described in greater detail below in connection with FIG. 4. A global reset circuit 224 receives output signal POR of voltage sensing circuit 222, and generates a global reset signal. The global reset signal is applied to many different parts of the circuitry including controller 220, and clock detection circuit 218. Clock detection circuit 218 receives the output of internal oscillator 212 and includes circuitry that counts the number of cycles of the internal oscillator clock signal. Clock detection circuit 218 also generates control signals (e.g., read commands) for register 226. Register 226 is preferably made up of non-volatile memory such as electrically erasable programmable read only memory (EEPROM). Register 226 is used to store clocking information such as clock source and frequency.

Figure 3:
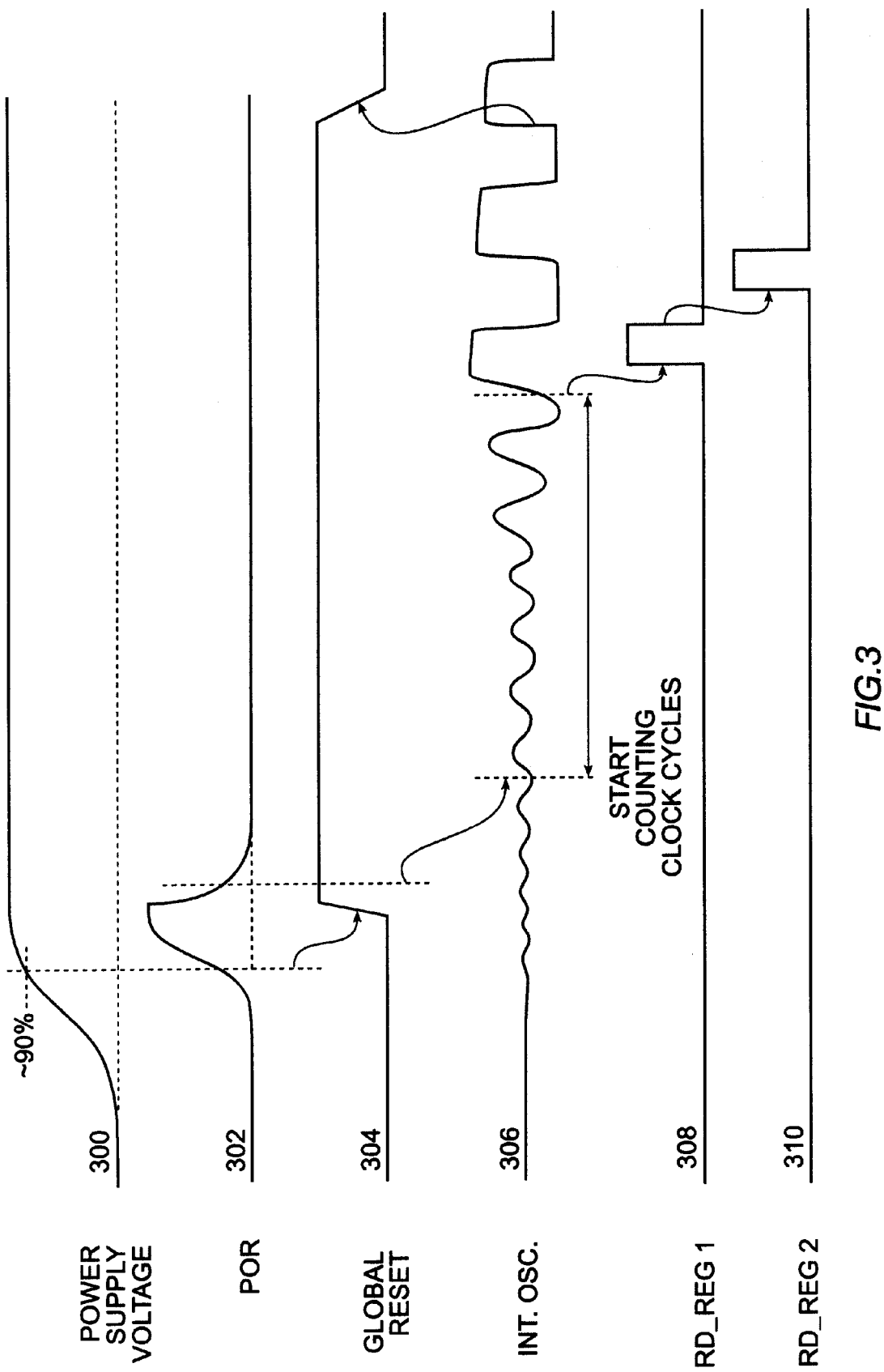
FIG. 3 is a timing diagram illustrating the operation of the power on reset according to one embodiment of the present invention.

The power on reset (or initialization) sequence for the circuit of FIG. 2 will be described in combination with the timing diagram shown in FIG. 3. As the voltage level on the power supply node VDD starts to increase (300), voltage sensing circuit 222 starts to detect and track its rise. Once VDD reaches a predetermined level, e.g., 90% of its final value, voltage sensing circuit 222 generates POR pulse (302). Global reset circuit 224 captures POR pulse and asserts the global reset signal (304). This signal preferably disables all circuitry within the chip except for those essential for the initialization sequence. This ensures that under global reset condition, the circuit consumes the minimum amount of power.

Because upon power up it is not known which clock source is to be selected, the resetting sequence uses the internal clock generated by internal oscillator 212 for its initial operation. In one embodiment, the POR signal is used to determine when the internal clock signal has settled and is available for use. Generally, internal oscillator 212 begins oscillation when the required conditions (e.g., the loop gain and phase shift) are met. However, the output amplitude and frequency of the internal clock signal (306) can be far from the final values at the initial stage of a power up because the power supply voltages have not reached the final values and the reference voltage (from, e.g., a bandgap circuit) has not settled to its final value. The internal clock signal is generally selected for use only after it has settled. As shown in FIG. 3, in this example, the falling edge of the POR signal 302 is used to activate clock detection circuit 218. In one embodiment, upon receiving a signal indicative of the falling edge of the POR signal, clock detection circuit 218 begins counting the clock cycles in the internal clock signal 306. After a predetermined number of clock cycles have been counted, clock detection circuit 218 sends a status signal to controller 220 indicating that the internal clock has settled. As the frequency of the internal oscillator is not known upon power up, the circuit assumes the worst case situation (lowest frequency). In an alternate embodiment, the volatile shadow registers are programmed by the POR signal (or a signal derived from POR) to set the frequency of the internal oscillator to its lowest frequency. In either case, clock detection circuit 218 counts, for example, 1500 cycles before indicating that the internal clock signal has settled. The number of the count, of course, varies depending on the oscillator circuit, power supply voltage level, the fabrication process, and other factors.

Control register 216 stores values that determine which clock source to select as the system clock and the frequency of the internal clock signal. In one embodiment, control register 216 includes non-volatile memory elements (e.g., EEPROM or flash memory elements) that store control information as to which clock sources to enable and which clock signal to select as the output clock signal. The non-volatile memory elements retain the control data when integrated circuit 100 is powered off so that the data is available upon power up. With this design, integrated circuit 100 does not need to be reprogrammed upon each power up. In a specific embodiment, control register 216 includes a first register and a second register (not shown). The first register contains a value that indicates which ones of the four clock sources to enable and which one to provide as the system clock. In one embodiment, two bits of storage are used to enable and select one of four clock sources. More bits can be used for more complex clocking schemes. The control data may be provided to control register 216 through a control input by a data source internal or external to integrated circuit 100. For example, the control data can come from controller 220, another controller on the same circuit board, or a data source external to integrated circuit 100 (i.e., a tester circuit during the manufacturing/testing phase). The second register contains a value that sets the frequency of the internal clock signal.

In an alternate embodiment, control register 216 includes a first set of primary registers and a second set of shadow registers, with each set including a first register and a second register. The primary set includes non-volatile first and second registers, as in the previous embodiment. The shadow set includes volatile first and second registers, corresponding to the first and second nonvolatile registers of the first set. At power up, the first and second registers of the shadow set are loaded with values that result in the selection of the internal clock signal and setting of the internal clock signal to the lowest clock frequency. The use of the shadow (volatile) registers allows reading of the contents of the first set of nonvolatile registers without disturbance at the onset of power on reset.

The contents of control register 216 is generally not read until the internal clock signal has settled (as indicated by clock detection circuit 218 and as described above). Referring back to FIG. 3, after it has been determined that the internal clock signal has settled, a read command RD_REG1 is activated on a control line that is applied to control register 216. This read command, that is for example in the form of a pulse 308, is used to read the value in the first register in the primary set of non-volatile registers in control register 216. Its contents are placed in the shadow register and decoded to indicate the selected clock source. If, for example, either of crystal oscillator 202 or RC oscillator 206 is selected, clock detection circuit 218 outputs that clock signal under the control of controller 220, and a new reset cycle begins. The new reset cycle is used to ensure the selected clock (i.e., crystal or RC) has settled and stabilized before enabling and starting the operation of the rest of the circuit. This can be accomplished by again counting a predetermined number (e.g., 450) of cycles of the selected clock before removing the reset signal. If the external clock is selected, external interface 210 is activated and the global reset signal is de-asserted to enable controller 220 to take control of the operation of the integrated circuit (e.g., start executing instructions). No clean up or settling time is usually necessary for an externally supplied clock.

If the contents of the first register of the primary set of registers indicate that the internal oscillator is selected as the system clock, global reset can be removed as the circuit has already ensured that the output signal of the internal oscillator has already settled. In one embodiment, a second read pulse RD_REG2 310 is generated to retrieve the contents of the second register in the primary set of registers inside control register 216. The contents are then loaded onto the corresponding shadow register and decoded to determine the frequency coefficients for internal oscillator 212. In response to this information, controller 220 adjusts the frequency of internal oscillator 212 to the desired frequency.

Figure 4:
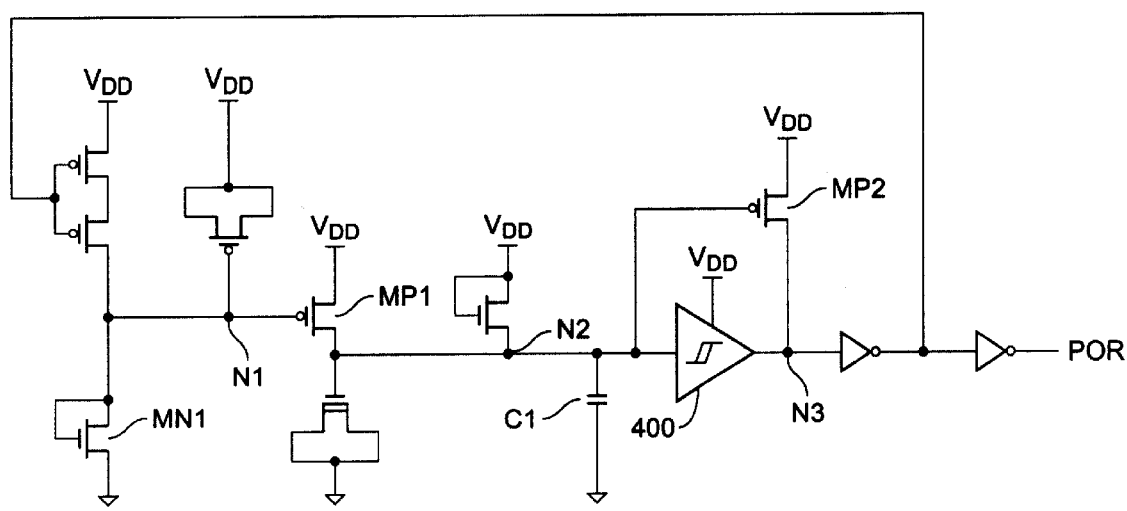
FIG. 4 is a simplified schematic diagram of an exemplary power supply voltage level detector.

One aspect of this power on reset method and circuitry that impacts its performance is the operation of the voltage sensing circuit 222. As discussed above, for a robust and accurate detection of power supply voltage level, a level detector is preferred that can operate at lower supply voltages that may ramp up at a very slow rate, and that may experience glitches that should be detected. Referring to FIG. 4 there is shown an exemplary embodiment for a voltage sensing circuit for use in the power on reset circuitry of the present invention. The exemplary voltage sensing circuit includes a Schmidt trigger 400 that is coupled in a feedback circuit. As VDD starts to rise from ground, the signal at node N1 rises until it reaches one threshold voltage Vt of n-channel MOS transistor MN1, at which point transistor MN1 turns on and clamps the signal at node N1 to about one Vt. The signal at the output POR, however, continues to rise with VDD. Capacitor C1 at the input of Schmidt trigger 400 (node N2) is slowly charged via a weak (i.e., long channel) p-channel transistor MP1. The signal level at N2 finally triggers Schmidt trigger 400 to pull its output down toward ground. By adjusting the size of transistor MP2, and the magnitude of capacitor C1, the circuit allows for adjusting the trip point of Schmidt trigger 400. In a preferred embodiment, the circuit is designed to adjust the trip point to a level that ensures VDD has reached 90% of its final value before POR is de-asserted. Capacitor C1 also slows down the circuit enough to enable it to operate properly with a slow rising VDD signal, as well as detecting glitches that may occur on VDD. In a preferred embodiment, capacitor C1 is made up of two polysilicon layers (poly 1 and poly 2) separated by a dielectric layer such as silicon dioxide. This allows the capacitor to be formed under existing metal layers to make optimum use of silicon area. Another advantageous feature of the voltage sensing circuit of the present invention is its ability to operate with a wide power supply range of, for example, from 1.7 volts to 5.5 volts.

Thus, the present invention provides an automatic power on reset circuit and method of initializing the circuit that may have multiple clock sources. Upon power up, most of the circuit is disabled to reduce power consumption, and an internal oscillator is used as a default clock signal for the operation of the reset circuitry. The circuit ensures that the internal clock signal has settled before reading contents of registers that program various aspects of the chip. Once all programming information is retrieved, reset is removed and the control of the circuit is relinquished to an on-chip controller. In a specific embodiment, the power on reset circuitry uses a robust and accurate low voltage level sensing circuit that operates with slow rising signals. While the above is a complete description of specific embodiments of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A method for resetting an integrated circuit upon power up, the method comprising:

detecting a voltage level on a power supply node and generating a power on detect signal when the voltage level reaches a predetermined level;

asserting a reset signal in response to the power on detect signal, the reset signal disabling a plurality of internal circuitry except at least an internal oscillator;

counting a first predetermined number of cycles of an oscillating output of the internal oscillator; and reading contents of a first register to select a clock source after the completion of the counting step.

2. The method of claim 1 wherein the step of comprises:

if the contents of the first register indicate selection of the internal oscillator, coupling the oscillating output to system clock and de-asserting the reset signal; and if the contents of the first register indicate selection of a second clock source other than the internal oscillator, coupling an output of the second clock source to system clock.

3. The method of claim 2 further comprising a step of reading contents of a second register for further programming of the integrated circuit after the step of reading the contents of the first register.

4. The method of claim 3 wherein the contents of the second register indicate a frequency of operation of the internal oscillator.

5. The method of claim 2 wherein the step of coupling the output of the second clock source to system clock further comprises a step of de-asserting the reset signal.

6. The method of claim 5, wherein, if the output of the second clock source requires time to settle, counting a second predetermined number of cycles of the output of the second clock source before de-asserting the reset signal.

7. The method of claim 1 wherein the step of counting a first predetermined number of cycles counts approximately 1500 cycles.

8. The method of claim 6 wherein the step of counting a second predetermined number of cycles counts approximately 450 cycles.

9. The method of claim 1 wherein the step of detecting generates the power on detect signal when the voltage level reaches at least 90% of its final value.

10. The method of claim 3 wherein the step of reading the contents of the first register further comprises the steps of:
   loading the contents of the first register into a shadow register; and
   decoding the contents of the shadow register.

11. The method of claim 2 wherein the second clock source may be one of an external clock signal, an RC oscillator or a crystal oscillator.

12. An integrated circuit comprising:
   a controller;
   a clock circuit coupled to the controller and configured to select between a plurality of clock sources including an internal oscillator;
   a voltage sensing circuit configured to detect a voltage level on a power supply node;
   a global reset circuit coupled to the voltage sensing circuit and configured to generate a global reset signal that, when activated, resets most of the integrated circuit except for at least the internal oscillator; and
   a register coupled to the clock circuit, and configured to store clock information,
   wherein, when the voltage sensing circuit detects a power up condition, the internal oscillator automatically runs for a predetermined number of cycles before the contents of the register are read to select one of the plurality of clock sources.

13. The integrated circuit of claim 12 wherein the register comprises non-volatile memory.

14. The integrated circuit of claim 13 wherein the clock information stored in the register comprises clock source selection data and clock frequency data.

15. The integrated circuit of claim 13 further comprising a shadow register comprising volatile memory that is coupled to the register comprising non-volatile memory.

16. The integrated circuit of claim 12 wherein the plurality of clock sources further comprises an RC oscillator, a crystal oscillator and an external clock.

17. The integrated circuit of claim 12 further comprising a clock detection circuit coupled to the clock circuit, the clock detection circuit comprising a counter configured to count the predetermined number of cycles.

18. The integrated circuit of claim 12 wherein the voltage sensing circuit is configured to detect a power on condition when the voltage level on the power supply node reaches at least 90% of its final value.

* * * * *